(12) United States Patent
Ducci et al.

(10) Patent No.: US 6,183,581 B1
(45) Date of Patent: Feb. 6, 2001

(54) ANTISTATIC TIRE

(75) Inventors: Stefano Ducci, Rome (IT); Yochiro Kondo, Tokyo (JP); Paolo Straffi, Rome; José Silicani, Grottaperrata, both of (IT)

(73) Assignee: Bridgestone Corporationn, Tokyo (JP)

( * ) Notice: Under 35 U.S.C. 154(b), the term of this patent shall be extended for 0 days.

(21) Appl. No.: 09/042,932

(22) Filed: Mar. 17, 1998

(30) Foreign Application Priority Data

Mar. 18, 1997 (IT) ................................. TO97A0228

(51) Int. Cl.[7] ............... B29D 30/52; B60C 1/00; B60C 11/00; B60C 19/08
(52) U.S. Cl. ................... 156/123; 152/152.1; 152/209.5; 152/209.18; 152/DIG. 2; 152/DIG. 3; 156/128.6
(58) Field of Search ............... 152/152.1, 209.5, 152/209.18, DIG. 2, DIG. 3; 157/13; 156/114, 123, 128.1, 128.6, 129

(56) References Cited

U.S. PATENT DOCUMENTS 2,207,099 * 7/1940 Maynard ........................ 152/209.5
2,737,237 * 3/1956 Herzegh .............................. 157/13
2,907,365  10/1959 MacDonald ........................ 152/209
3,039,520 * 6/1962 Meserve .............................. 157/13
5,872,178 * 2/1999 Kansupada et al. .............. 152/152.1
5,898,047 * 4/1999 Howald et al. ................... 152/152.1

FOREIGN PATENT DOCUMENTS 0 658 452 A1   12/1994 (EP).
0 705 722 A1    4/1996 (EP).
0 718 127 A1    6/1996 (EP).
   747243 *   12/1996 (EP) ................................. 152/152.1
0 787 604 A2    8/1997 (EP).
   881060 *   12/1998 (EP).
   544757     2/1941 (GB).

* cited by examiner

Primary Examiner—Steven D. Maki
(74) Attorney, Agent, or Firm—John H. Hornickel, Esq.; Michael Sand, Esq.

(57) ABSTRACT

An antistatic tire and relative production method, whereby a portion of a tread made of an electrically insulating mix is hollowed out and filled with a cement (C) in the form of a carbon black mix in a volatile liquid; the carbon black mix being left inside the hollow portion when the volatile liquid evaporates, and defining inside the tread at least one conducting body communicating with a rolling surface of the tire.

7 Claims, 2 Drawing Sheets

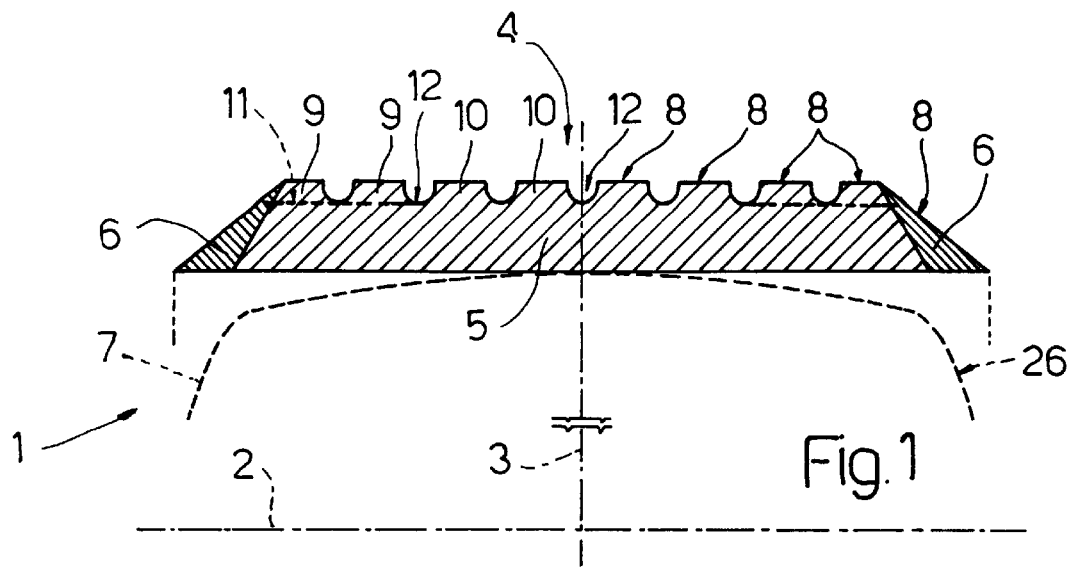
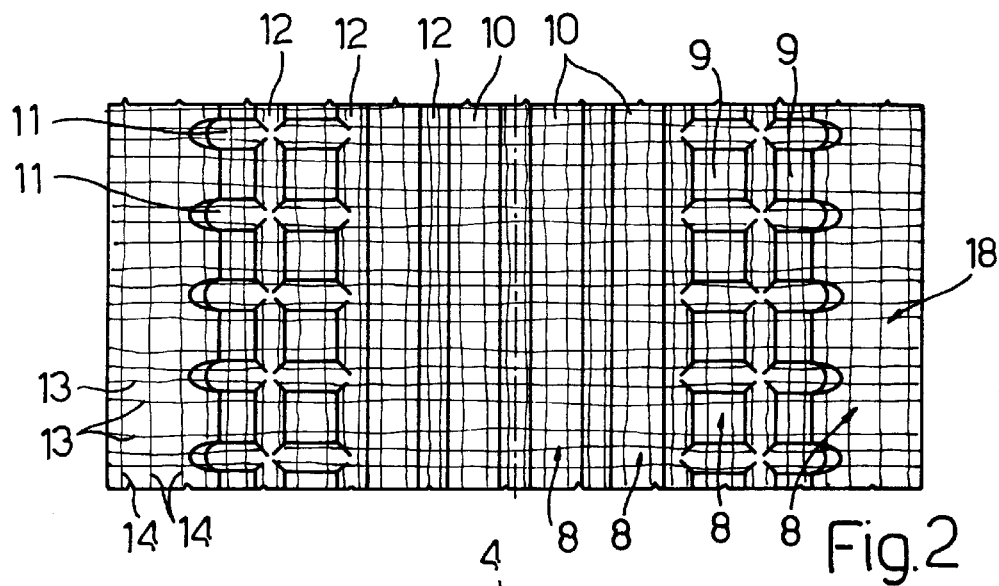
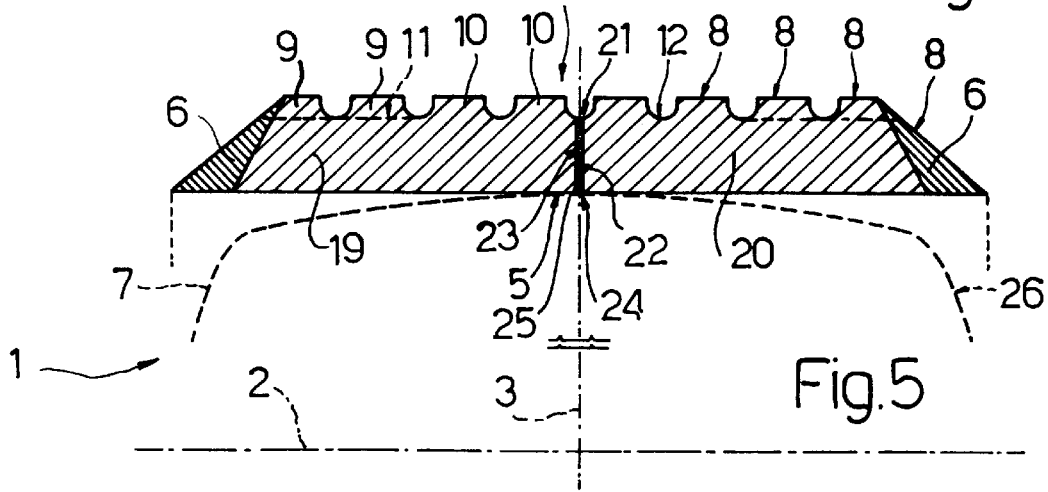

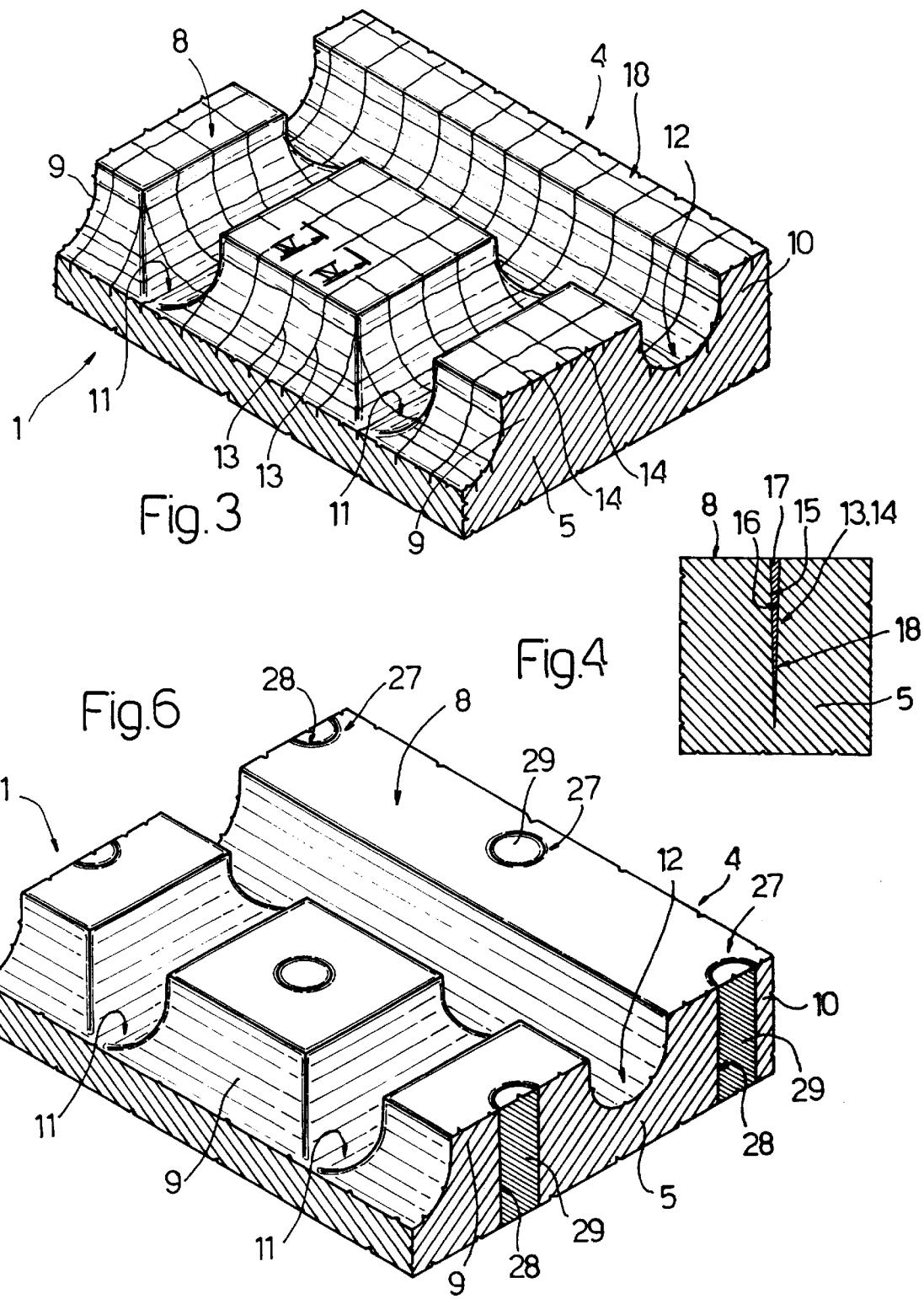

ANTISTATIC TIRE

BACKGROUND OF THE INVENTION

1. Technical Field

The present invention relates to an antistatic tire.

More specifically, the present invention relates to an antistatic tire of the type comprising electric current conductors on the tread, for grounding the static electricity of a vehicle.

2. Background Information

From EP-A-705722, antistatic tires are known to be formed wherein the tread, shoulders and sidewalls are covered with a thin conductive layer of a conducting mix, which is applied uniformly on the tread blocks and in the grooves between the blocks to form an electrical bridge between the sidewalls, shoulders and tread.

The above solution involves several drawbacks, due to rapid in-service wear of the conductive layer portion covering the blocks, and crumbling of the conductive layer portion covering the grooves, as a result of the fatigue stress to which the tread is subjected in use. Crumbling of the conductive layer is especially marked in the groove region, where the effects of fatigue stress concentrate.

As a result, the original continuous conducting layer of the tire is soon interrupted at various points and no longer capable of grounding the electric charges.

SUMMARY OF THE INVENTION

It is an object of the present invention to provide a straightforward, low-cost method of producing antistatic tires capable of maintaining lifelong electrical conductivity.

According to the present invention, there is provided a method of producing an antistatic tire, the tire comprising a tread made of at least one electrically insulating mix and defined externally by a rolling surface of the tire; and the method being characterized by comprising the steps of forming a hollow region in the tread, through the rolling surface; pouring into said hollow region a cement comprising a carbon black mix in a volatile liquid; and evaporating the volatile liquid to leave said carbon black mix inside the hollow region and so define, inside the tread, at least one electrically conducting body communicating with said rolling surface.

According to the invention, there is provided a method of producing an antistatic tire comprising the steps of providing a tread having an electrically insulating central portion and a pair of outer electrically conducting shoulders; forming a plurality of spaced slits extending only partially into the tread inwardly from a rolling surface of the tread, the slits extending transversely across the central portion of the tread and into the shoulders; pouring a cement comprising a carbon black mix in a volatile liquid into the slits; evaporating the volatile liquid to leave said carbon black mix inside the slits to define, inside the tread, a continuous electrically conducting body; and connecting two electrically conducting sidewalls to the shoulders to form an antistatic tire having a continuous electrical path extending from the rolling surface of the tread to the sidewalls.

According to a first preferred embodiment of the above method, said tread comprises a number of surface grooves defining a given groove pattern on the tread; and said hollow region being obtained by forming in the tread, through the rolling surface and inside said grooves, a matrix of slits for receiving said cement and so defining, inside the tread, an electrically conducting matrix constituting said electrically conducting body.

According to a further preferred embodiment of the above method, said hollow region is obtained by cutting the tread longitudinally into at least two portions; placing said portions adjacent to each other to define at least one longitudinal gap defining the hollow region; feeding said cement into said gap; and bringing said portions together again.

According to yet a further preferred embodiment of the above method, said hollow region is obtained by forming through holes in the tread.

The present invention also relates to an antistatic tire formed using the above method.

According to the present invention, there is provided an antistatic tire comprising a tread made of one or more electrically insulating mixes and defined externally by a rolling surface; characterized in that said tread has a hollow region formed through the rolling surface, and comprises at least one electrically conducting body housed inside said hollow region and communicating with said rolling surface; said electrically conducting body being formed by pouring into said hollow region a cement comprising a carbon black mix in a volatile liquid; and evaporating said volatile liquid to leave said carbon black mix inside the hollow region.

According to a first preferred embodiment of the above tire, said tread comprises a number of surface grooves defining a given groove pattern on the tread; said hollow region comprising a matrix of slits formed in the tread through the rolling surface and inside said grooves wherein the slits extend only partially into the tread from the rolling surface; and said electrically conducting body comprising an electrically conducting matrix defined by said carbon black mix occupying each said slit.

According to a further preferred embodiment of the above tire, the tread comprises at least two longitudinal portions integral with each other and separated by a gap defining said hollow region; said electrically conducting body being housed inside said gap.

According to a further preferred embodiment of the above tire, the tread comprises a number of through holes; a said electrically conducting body being housed inside each said hole.

BRIEF DESCRIPTION OF THE DRAWINGS

A number of non-limiting embodiments of the present invention will be described by way of example with reference to the accompanying drawings, in which:

FIG. 1 shows a schematic cross section, with parts removed for clarity, of a first preferred embodiment of the tire according to the present invention;

FIG. 2 shows a plan view of a portion of the FIG. 1 tire;

FIG. 3 shows a view in perspective of the tire portion in FIG. 2;

FIG. 4 shows a section along line IV—IV in FIG. 3;

FIG. 5 shows a schematic cross section, with parts removed for clarity, of a second preferred embodiment of the tire according to the present invention;

FIG. 6 shows a schematic, partially sectioned view in perspective, with parts removed for clarity, of a third preferred embodiment of the tire according to the present invention.

DESCRIPTION OF THE PREFERRED EMBODIMENT

Number 1 in FIG. 1 indicates an antistatic tire having an axis of rotation 2 and a plane of symmetry 3 perpendicular to axis 2.

Tire 1 comprises a tread 4 in the form of a cylindrical shell extending about axis 2 and having two symmetrical halves on either side of plane 3; tread 4 comprises a central portion 5, and two annular shoulders 6 located on either side of plane 3 to define the opposite lateral ends of tread 4; and shoulders 6 are formed from a rubber mix having an electrical resistivity of less than $10^9$ ohms×cm and substantially equal to the electrical resistivity of the mix on sidewalls 7 of tire 1.

With reference to FIGS. 2, 3 and 4, tread 4 is defined externally by a rolling surface 8, which is defined by the outer surfaces of shoulders 6, and by the outer surfaces of a number of blocks 9 and annular beads 10 defined on central portion 5 by a number of grooves 11 substantially crosswise to plane 3, and by circumferential annular grooves 12.

Tread 4 also comprises a network or matrix of slits comprising a number of slits 13 and 14, which extend to a given depth, preferably of at least a millimeter, through rolling surface 8 and the surface of grooves 11 and 12. Each slit 13, 14 is defined by two facing walls 15 and 16, which define part of a hollow portion or region 17 extending along the whole of tread 4.

Hollow region 17 houses an electrically conducting matrix 18 made from a carbon black mix having an electrical resistivity of less than $10^9$ ohms×cm to form an electrical bridge between the tread and sidewalls 7 of tire 1, which, as stated, are made from an electrically conducting mix. Matrix 18 is formed from a cement "C" comprising the aforementioned mix, which is of known type and provides for bonding the facing walls 15 and 16 of slits 13 and 14.

The electrically conducting matrix 18 is formed by means of a series of operations comprising the steps of knurling rolling surface 8 and grooves 11 and 12 of tread 4 to form the matrix of slits 13 and 14; stressing tread 4 to separate the facing walls 15 and 16 of slits 13 and 14 and define hollow region 17; and pouring inside hollow region 17 a cement "C" comprising said carbon black mix in a volatile liquid solution, which, when evaporated, leaves the mix inside hollow region 17.

In use, whereas the part of matrix 18 extending along at least part of rolling surface 8 is worn off, the part of matrix 18 extending along grooves 11 and 12 remains substantially intact, and is capable of ensuring life-long conductivity of tire 1.

In the FIG. 5 variation, tread 4 is defined by two longitudinal annular portions 19 and 20 located on either side of plane 3 and separated by an annular gap 21, which extends between two parallel facing surfaces 22 and 23, and defines a hollow portion or region 24.

Hollow region 24 houses an electrically conducting body 25 having an electrical resistivity of less than $10^9$ ohms×cm to form an electrical bridge between the rolling surface and an electrically conducting carcass 26 of tire 1. Electrically conducting body 25 is defined by a carbon black mix with an electrical resistivity of less than $10^9$ ohms×cm, and which provides for bonding surfaces 22 and 23.

Conducting body 25 is formed by means of a sequence of operations comprising the steps of cutting tread 4 longitudinally into portions 19 and 20; placing portions 19 and 20 adjacent to each other to define longitudinal gap 21; pouring inside gap 21 a cement "C" comprising said carbon black mix in a volatile liquid solution; and bringing portions 19 and 20 back together again along parallel facing surfaces 22 and 23 of gap 21 to bond portions 19 and 20 as the volatile liquid evaporates.

Tread 4 may of course be divided into more longitudinal portions to define two or more gaps 21.

In the FIG. 6 variation, central portion 5 of tread 4 comprises a hollow portion or region 27 defined by a number of through holes 28, each of which houses an electrically conducting body 29 to form an electrical bridge between rolling surface 8 and carcass 26 of tire 1. Each electrically conducting body 29 is made from a carbon black mix with an electrical resistivity of less than $10^9$ ohms×cm, and is formed by pouring into respective hole 28 a cement C comprising the aforementioned mix in a volatile liquid, and allowing the volatile liquid to evaporate.

Holes 28 and respective bodies 29 are obviously so arranged on rolling surface 8 that the portion (not shown) of tire 1 contacting the road surface always contains at least one body 29.

We claim:

1. A method of producing an antistatic tire comprising the steps of providing a tread having an electrically insulating central portion and a pair of outer electrically conducting shoulders; forming a plurality of spaced slits extending only partially into the tread inwardly from a rolling surface of the tread, the slits extending transversely across the central portion of the tread and into the shoulders; pouring a cement comprising a carbon black mix in a volatile liquid into the slits; evaporating the volatile liquid to leave said carbon black mix inside the slits to define, inside the tread, a continuous electrically conducting body; and connecting two electrically conducting sidewalls to the shoulders to form an antistatic tire having a continuous electrical path extending from the rolling surface of the tread to the sidewalls.

2. A method as claimed in claim 1, wherein the central portion of the tread comprises a number of surface grooves defining a given groove pattern on the tread surface.

3. A method as claimed in claim 1, wherein said slits are formed by knurling.

4. A method as claimed in claim 1, further comprising the step of stressing the tread to open said slits for pouring the volatile liquid into said slits.

5. An antistatic tire comprising a tread having an electrically insulating central portion and a pair of electrically conducting shoulders located on opposite sides of the central portion, said tread defining an external rolling surface; a pair of electrically conducting sidewalls electrically connected to the shoulders; a plurality of spaced slits extending transversely across the central portion of the tread and into the shoulders and extending only partially into the tread from the rolling surface, said slits being filled with an electrically conducting body having been formed by pouring into the slits a cement comprising a carbon black mix in a volatile liquid and evaporating said volatile liquid to leave the carbon black mix inside the slits, the electrically conducting body forming a continuous electrical path from the rolling surface to the sidewalls.

6. The tire as claimed in claim 5 wherein the slits are defined by two facing walls which extend transversely across the entire tread.

7. The tire as claimed in claim 5 including a plurality of spaced circumferentially extending slits; and in which said circumferential slits are filled with a carbon black mix.

* * * * *